UNITED STATES PATENT OFFICE.

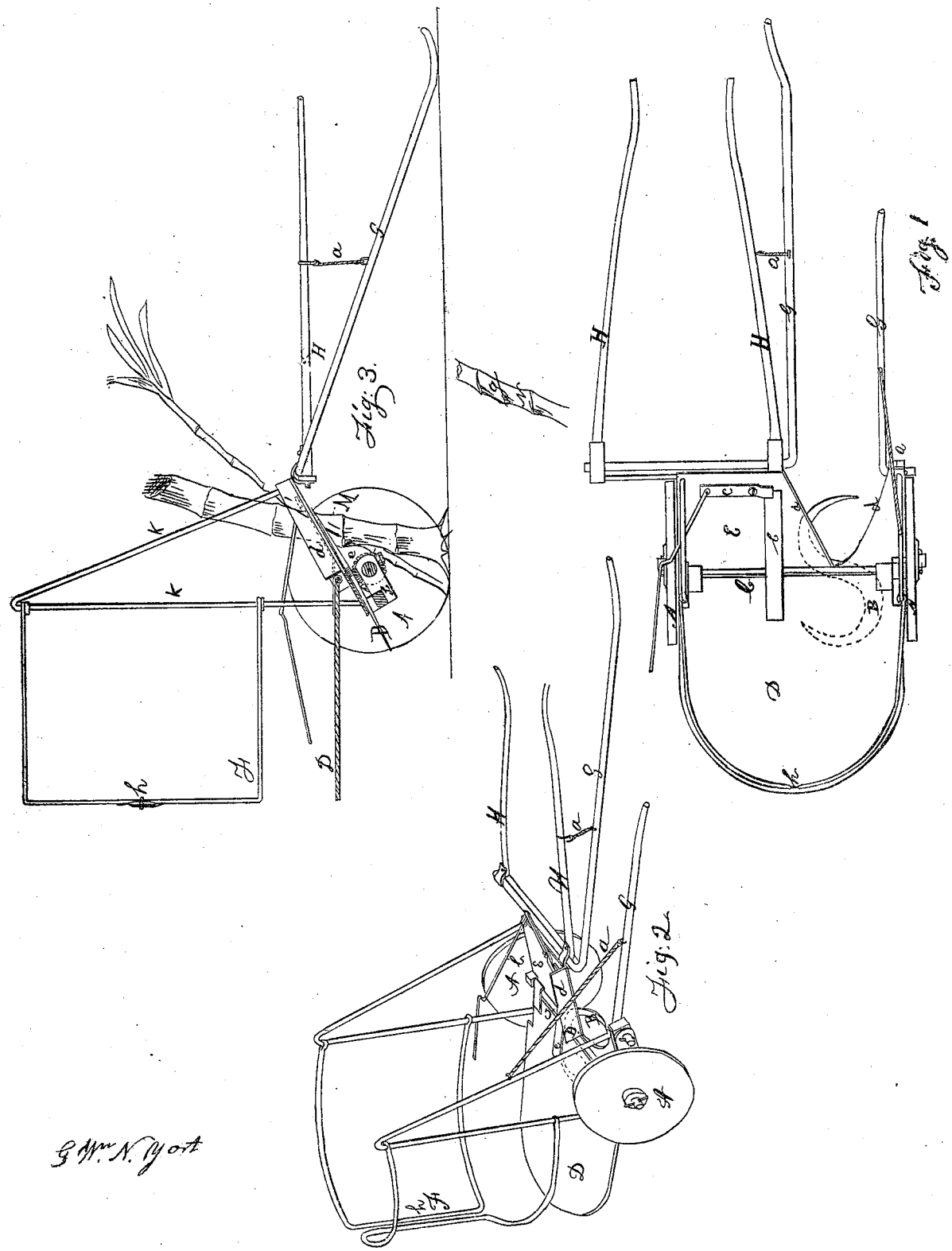

G. W. N. YOST, OF PORT GIBSON, MISSISSIPPI.

IMPROVEMENT IN CORN-HARVESTERS.

Specification forming part of Letters Patent No. 14,076, dated January 8, 1856.

*To all whom it may concern:*

Be it known that I, GEORGE W. N. YOST, of Port Gibson, Claiborne county, State of Mississippi, have invented certain new and useful Improvements in Corn-Harvesters; and I do hereby declare that the following is a full and exact description thereof, reference being had to the accompanying drawings, and to the letters of reference marked thereon.

Figure 1 is a plan view. Fig. 2 is a perspective view. Fig. 3 is a vertical section.

In Fig. 1 A are the wheels; B, the knife shown in dotted lines; C, the rod on which the adjustable platform is hung; D, the adjustable platform; E, the platform; F, the adjustable gate; G, the adjustable lifters; H, the shaft; a, the chains for adjusting the lifters; b, lever on adjustable platform; c, lever for adjusting the platform; d, the finger-board.

In Fig. 2 the same letters designate like parts.

In Fig. 3 A are the wheels; I, the shaft of the driving-wheel and pinion; e f, pinion on upright shaft; F, the gate; K, uprights to support the gate; L, bearing for shaft I and pinion-shaft e; D, the adjustable platform; d, the finger-board; G, the adjustable lifters; a, the chain; H, the shaft; M, stalks of corn in a position to be cut; N, a part of Fig. 3; a, stalks with an incision, g, showing the angle at which the knife cuts the stalk in two; h, the manner of opening and fastening the gate.

To enable others skilled in the art to make and use my invention, I will proceed to describe its construction and operation.

In constructing my machine I use any of the materials in common use for such purposes and construct the parts as above described, thus constituting a corn-harvester of cheap construction and great utility, one man cutting with it more than six by hand.

In the operation of my invention, as the machine is moved forward the driving-wheel communicates motion to the bevel-wheel which works into the pinion e, which causes the sickle-shaped knife to revolve, and by means of the adjustable lifters, which are allowed to run on or near the ground, all stalks of corn which have been blown down or have fallen across the track are gathered between the same and caused to come in contact with the knife, (being between the finger-board and knife,) as seen in Fig. 3, cutting the stalk at the angle, or nearly so, as shown in drawings at N, with the incision g. I find that in all fields of corn there are more or less stalks blown down, and in order to gather these it is necessary to have some invention by which they can be lifted or brought within the range of the knives. This I accomplish by means of my adjustable lifters. The knives are set to cut at the angle, as shown, and which is of vast importance, as the cut is much easier made than if at right angles with the stalk. As the corn is cut off it is taken by a man standing on the platform E and set back on the adjustable platform D, and is supported in a vertical position by means of the frame F, and when sufficient is set up to form a shock the tops are bound and the frame opened at h, and the lever c is moved, which allows the adjustable platform to fall, and the shock is left standing already secured.

Having thus fully described the construction and operation of my invention, what I claim as new, and desire to secure by Letters Patent, is—

The combination of the adjustable lifters G G, finger-board d, revolving sickle-shaped knives B, vertical adjustable frame F, and the adjustable platform D, for the purpose of harvesting corn, when all are operated and operating as described and herein set forth.

GEO. W. N. YOST.

Witnesses:
   J. C. CLAYTON,
   T. G. CLAYTON.